United States Patent [19]

Watanabe et al.

[11] Patent Number: 4,679,992
[45] Date of Patent: Jul. 14, 1987

[54] TURBO-COMPOUND COMPRESSOR SYSTEM

[75] Inventors: Kinichiro Watanabe, Kanuma; Kunio Horiai, Oyama; Tomoyuki Mashiko, Oyama; Hitoshi Kato, Oyama; Hiromasa Yamaguchi, Oyama; Toshihiko Nishiyama, Oyama, all of Japan

[73] Assignee: Kabushiki Kaisha Komatsu Seisakusho, Tokyo, Japan

[21] Appl. No.: 656,374

[22] Filed: Oct. 1, 1984

[30] Foreign Application Priority Data

Sep. 29, 1983 [JP] Japan .................. 58-149528[U]

[51] Int. Cl.⁴ .................................... F04B 17/00
[52] U.S. Cl. ............................ 417/364; 417/380
[58] Field of Search ........... 60/605; 417/364, 380, 417/312, 313

[56] References Cited

U.S. PATENT DOCUMENTS

| | | | |
|---|---|---|---|
| 3,122,308 | 2/1964 | Anderson et al. | 417/312 X |
| 3,204,859 | 9/1965 | Crooks | 417/380 X |
| 3,495,766 | 2/1970 | Hinkle | 417/380 |

FOREIGN PATENT DOCUMENTS

| | | | |
|---|---|---|---|
| 165926 | 11/1980 | Japan | 417/380 |
| 1441498 | 6/1976 | United Kingdom | 417/380 |

Primary Examiner—Michael Koczo
Attorney, Agent, or Firm—Armstrong, Nikaido, Marmelstein & Kubovcik

[57] ABSTRACT

A turbo-compound compressor system includes a booster compressor connected to the output shaft of a power recovery turbine which is disposed downstream of the outlet of an expansion turbine in a turbocharger for an internal combustion engine and drivable by the exhaust gas of the engine, and a rotary positive-displacement air compressor drivable by the engine also into which the air delivered by the booster compressor is supplied through an air supply conduit having a throttle valve. The turbo-compound compressor system further includes a bypass line provided therein with a closing valve and adapted to prevent surging caused in the booster compressor.

14 Claims, 16 Drawing Figures

FIG. 2D

TURBO-COMPOUND COMPRESSOR SYSTEM

BACKGROUND OF THE INVENTION

1. Field of the Invention:

This invention relates to compressor systems. More particularly, it relates to an apparatus for preventing surging in a pneumatic system for a turbo-compound compressor system including a rotary positive-displacement air compressor drivable by an internal combustion engine.

2. Description of the Prior Art:

A small, inexpensive and highly efficient turbo-compound compressor system which utilizes the exhaust gas energy of an internal combustion engine effectively is disclosed in Japanese Utility Model Application Laid-Open Publication No. 55-165926 published provisionally on Nov. 28, 1980. A pneumatic system for a rotary positive-displacement air compressor driven by an internal combustion engine having a turbocharger supercharges the engine and includes a booster compressor connected to a power recovery turbine disposed at the outlet of an expansion turbine in the turbocharger. The air discharged by the booster compressor is supplied to the rotary positive-displacement air compressor to increase the pressure of the air drawn thereinto.

More fundamental art relating to the turbo-compound compressor system includes a rotary air compressor system of the type disclosed in British Patent Specification No. 1 441 498.

These known turbo-compound compressor systems have the disadvantage of having a surging phenomenon in the pneumatic system when the rotary positive-displacement air compressor is in or close to the no-load state. Especially in the pneumatic system of Japanese Publication No. 55-165926, surging is very likely to occur in the booster compressor when the rotary positive-displacement air compressor is in or close to the no-load state.

SUMMARY OF THE INVENTION

Under these circumstances, it is an object of this invention to provide a turbo-compound compressor system in which a part or all of the air discharged by a booster compressor connected to a power recovery turbine disposed at the output of an expansion turbine in a turbocharger for an internal combustion engine is released through a bypass line having a closing valve to prevent the surging of the booster compressor when the quantity of the air discharged by a rotary positive-displacement air compressor has been reduced.

It is another object of this invention to provide an apparatus for preventing surging in a booster compressor, while ensuring the freedom from any environmental problem, such as the generation of noise or the leakage of oil mist, when air is discharged from the booster compressor.

According to a first aspect of this invention, there is provided a turbo-compound compressor system comprising a booster compressor connected to a power recovery turbine disposed downstream of the outlet of an expansion turbine in a turbocharger for an internal combustion engine and driven by the exhaust gas of the engine, and a rotary positive-displacement air compressor which is drivable by the engine and into which the air discharged by the booster compressor is supplied through a pipeline means, characterized by including a bypass line provided for preventing surging and having a closing valve.

According to a second aspect of this invention, the bypass line is connected to the pipeline means through which the air discharged by the booster compressor is supplied into the rotary positive-displacement air compressor.

According to a third aspect of this invention, the bypass line is connected to an exhaust line extending between the outlet of the expansion turbine and the inlet of the power recovery turbine.

BRIEF DESCRIPTION OF THE DRAWINGS

The above and many other advantages, features and additional objects of this invention will become manifest to those versed in the art upon making reference to the following detailed description and accompanying drawings in which preferred structural embodiments incorporating the principles of this invention are shown by way of illustrative example.

FIG. 2 is a view similar to FIG. 1, but showing another embodiment of this invention;

FIG. 2D is a view of another embodiment of a control for the closing valve;

FIG. 3A is a view of a modification of the embodiment of FIG. 3;

DETAILED DESCRIPTION OF THE PREFERRED EMBODIMENTS

The invention will now be described in further detail with reference to the accompanying drawings.

Figure 1:
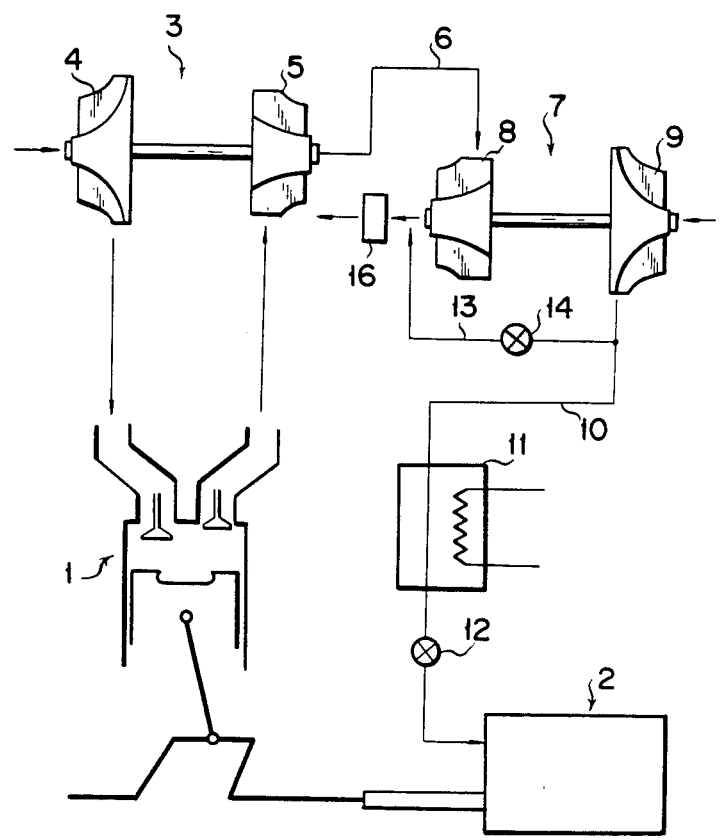
FIG. 1 is a general schematic view showing a turbo-compound compressor system according to a first embodiment of this invention.

Referring first to FIG. 1 which is a general schematic view showing a first exemplified embodiment of a turbo-compound compressor system according to this invention, reference numeral 1 represents an internal combustion engine, 2 a rotary positive-displacement air compressor drivable by the engine 1, and 3 a turbocharger for the engine 1 (hereinafter merely referred to as the engine turbocharger). The engine turbocharger 3 has a compressor wheel 4 of which the outlet is connected to the inlet of the engine 1. The outlet of the engine 1 is connected by an exhaust line to the inlet of an expansion turbine 5 in the turbocharger 3. The expansion turbine 5 has an outlet connected by a line 6 to the inlet of a power recovery turbine 8. The power recovery turbine 8 has an output shaft connected directly to a centrifugal booster compressor 9. The booster compressor 9 has an output connected by an air line 10 to the air inlet of the rotary positive-displacement air compressor 2. The air line 10 has a cooler 11 and a throttle valve 12. The cooler 11 cools the compressed air delivered by the booster compressor 9. The throttle valve 12 is partly or totally closed to reduce or stop the flow of the air delivered by the booster compressor 9 when the compressor 2 is required to deliver only a small quantity of air or not required to deliver any air, namely, when the pressure of air in an air reservoir tank located downstream of the compressor 2, but not shown has risen to a predetermined level.

Figure 5:
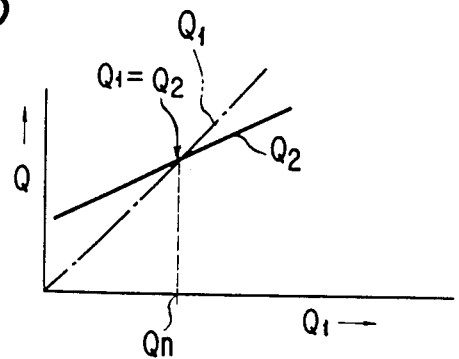
FIG. 5 is a graph showing the relationship between the input $Q_1$ to a rotary positive-displacement air compressor drivable by an internal combustion engine and the output $Q_2$ of an expansion turbine in a turbocharger for the engine.
Figure 6:
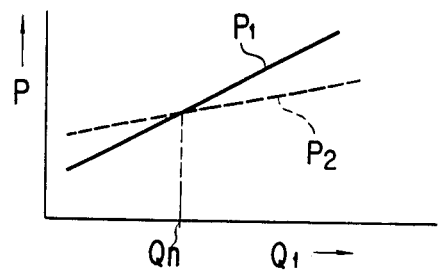
FIG. 6 is a graph showing the relationship between the output pressure $P_1$ of the expansion turbine and the output pressure $P_2$ of a booster compressor for supplying compressed air to the rotary positive-displacement air compressor.

The relationship between the output $Q_2$ of the expansion turbine 5 and the input $Q_1$ of the rotary positive-displacement air compressor 2 is graphically shown in FIG. 5. As the input $Q_1$ to the compressor 2 decreases, the output $Q_2$ of the expansion turbine 5 decreases, too. The decrease of $Q_2$, however, takes place at a lower rate than $Q_1$, and if $Q_1$ drops below a certain level $Q_n$, the output pressure $P_1$ of the expansion turbine 5 is lower than the output pressure $P_2$ of the booster compressor 9, as shown in FIG. 6. Therefore, the air discharged by the booster compressor 9 is allowed to flow to the inlet of the power recovery turbine 8.

Referring again to FIG. 1, the first embodiment of this invention employs in order to prevent surging in the booster compressor 9 a bypass discharge line 13 connected to the air line 10 in the vicinity of the outlet of the booster compressor 9 and having a closing valve 14. The discharge line 13 has an outlet located in the vicinity of the outlet of the power recovery turbine 8.

In the turbo-compound compressor system of FIG. 1, the expansion turbine 5 is rotated by the exhaust gas of the engine 1 and the compressor wheel 4 is driven simultaneously to supercharge the engine 1. The exhaust gas of the expansion turbine 5 rotates the power recovery turbine 8 and thereby the booster compressor 9. The air discharged by the booster compressor 9 is supplied by the line 10 to the rotary positive-displacement air compressor 2. If the input to the compressor 2 is reduced, the closing valve 14 is opened to allow the air delivered by the booster compressor 9 to be released through the discharge line 13, whereby the occurrence of surging in the booster compressor 9 may be avoided.

Figure 7:
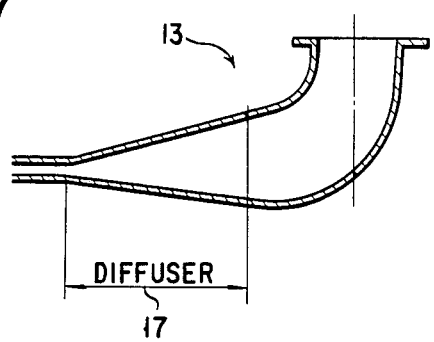
FIG. 7 is an enlarged cross sectional view of a part of a pipeline defining a bypass line in the turbo-compound compressor system of this invention.

A turbo-compound compressor system according to a second embodiment of this invention is shown in FIG. 2. According to this system, the discharge line 13 has an outlet open to the atmospheric air downstream of a silencer 15 provided downstream of the closing valve 14 and having an oil mist separator. The discharge line 13 may be provided with a diffuser 17 as shown in FIG. 7. The diffuser 17 lowers the velocity of the outgoing air to a level substantially equal to that of the air cooled by a cooling fan (not shown) for the engine 1. The release to the open atmosphere of the air discharged by the booster compressor 9 as proposed in FIG. 2 is the simplest method of preventing surging in the booster compressor 9. The provision of the oil mist separator and the diffuser is effective for preventing environmental problems, such as air pollution and the generation of noise.

Figure 3:
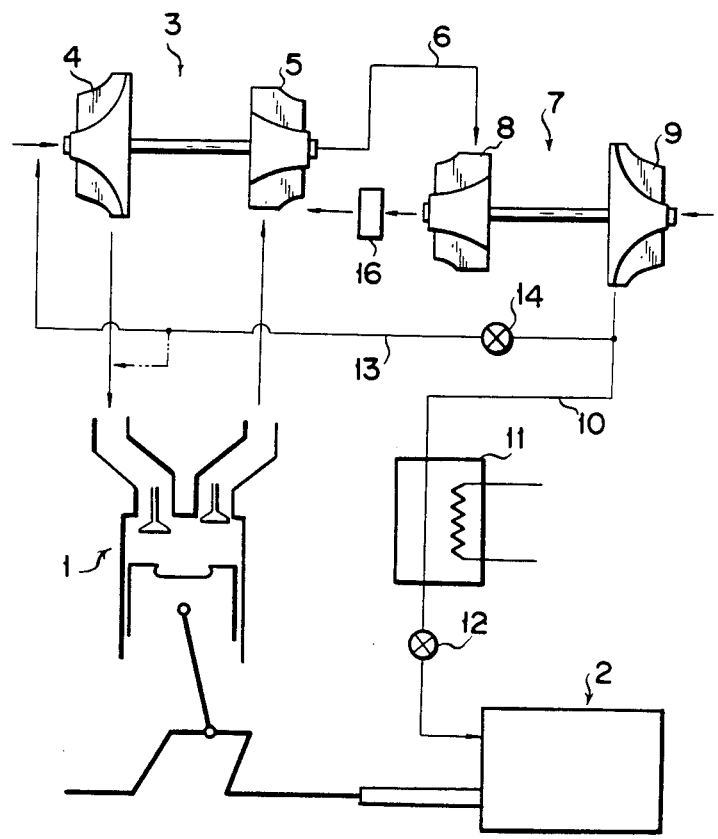
FIG. 3 is a view similar to FIG. 1, but showing still another embodiment of this invention.

Referring now to FIG. 3, there is shown a turbo-compound compressor system according to a third embodiment of this invention. According to this system, the discharge line 13 has an outlet connected to the inlet of the compressor wheel 4 of the engine turbocharger 3, FIG. 3, or directly to an air supply line for the engine 1, FIG. 3A.

Figure 2A:
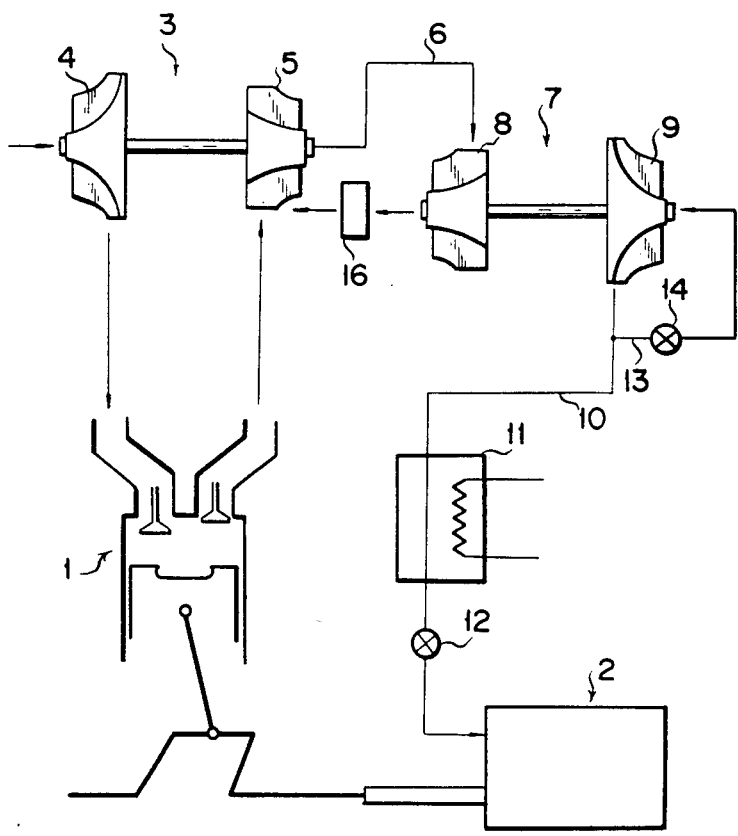
FIG. 2A is a view of one modification of the embodiment of FIG. 2.
Figure 2B:
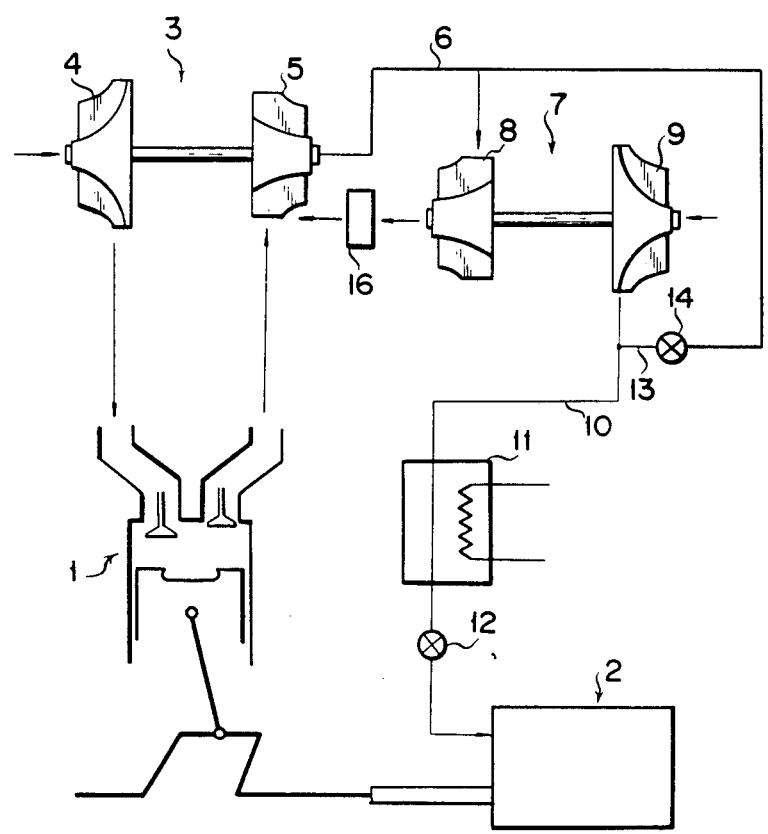
FIG. 2B is a view of a second modification of the embodiment of FIG. 2.
Figure 2C:
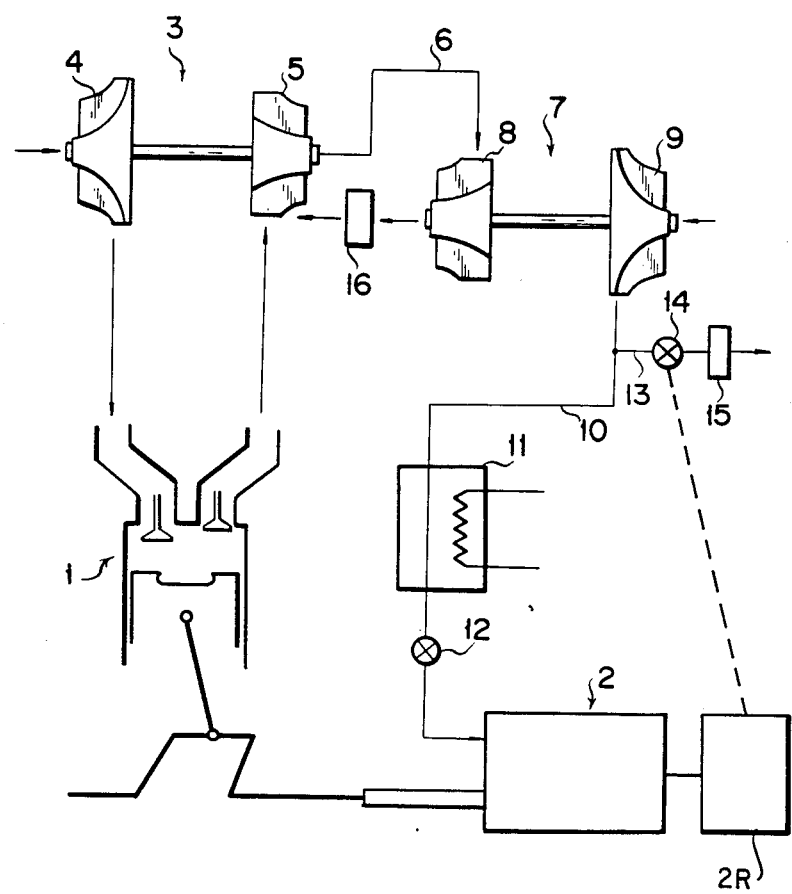
FIG. 2C is a view of one embodiment of a control for the closing valve.
Figure 2D:
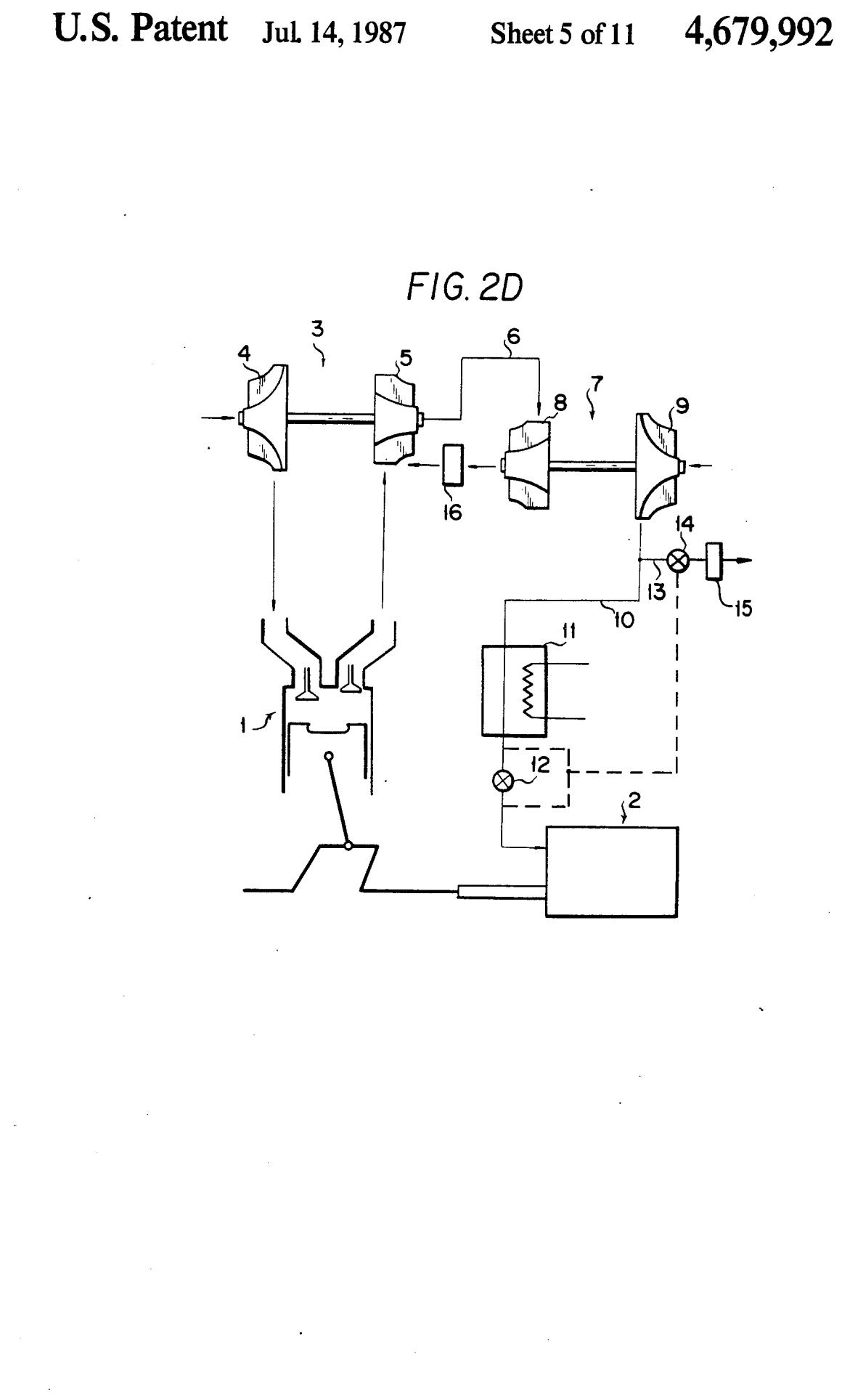

The system of FIG. 2 can be modified such that the outlet of the discharge line 13 may, for example, be connected to muffler 15, as shown in FIG. 2, or to the inlet of the booster compressor 9, as shown in FIG. 2A, or to or the inlet of the power recovery turbine 8 as shown in FIG. 2B. All of these modified arrangements effectively prevent the occurrence of environmental problems, such as air pollution and noise.

Figure 4:
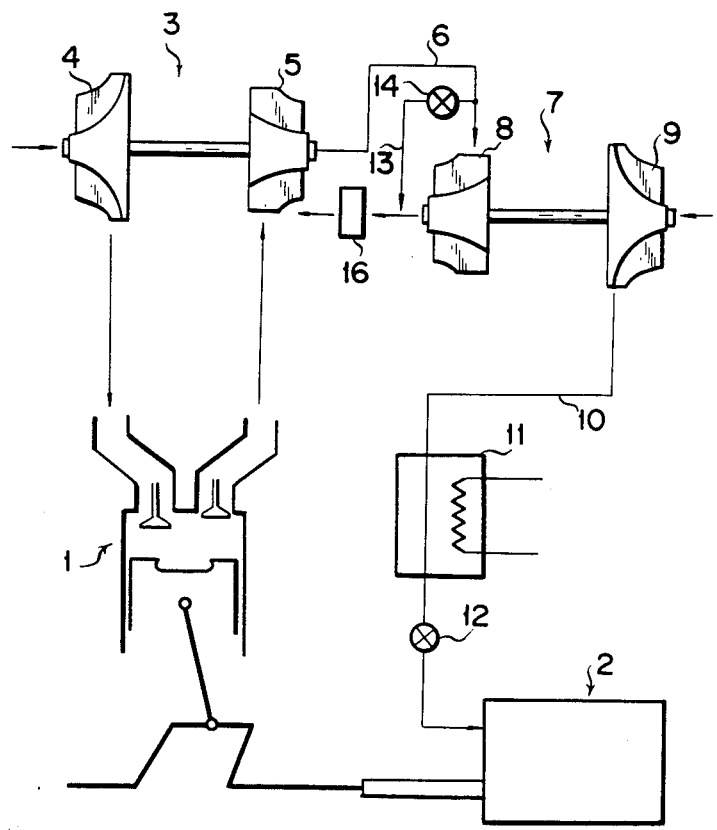
FIG. 4 is a view similar to FIG. 1, but showing a further embodiment of this invention.

A turbo-compound compressor system according to a fourth embodiment of this invention is shown in FIG. 4. This system includes a bypass discharge line 13 having a closing valve 14 and connected to the line 6 extending from the outlet of the expansion turbine 5 of the engine turbocharger 3 to the inlet of the power recovery turbine 8. If the rotary positive-displacement air compressor 2 has a reduced input, the closing valve 14 is opened to release through the discharge line 13 the exhaust gas of the engine 1 which is supplied from the expansion turbine 5 to the power recovery turbine 8. As a result, the air output of the booster compressor 9 is greatly reduced, and no surging is likely to occur in the booster compressor 9. The discharge line 13 has an outlet connected to a line downstream of the outlet of the power recovery turbine 8 or upstream of the inlet of a muffler 16.

Reference is now made in greater detail to the operation of the closing valve 14 in the bypass line. The air output of the rotary positive-displacement air compressor 2 drivable by the engine 1 is usually controlled by detecting a rise in the pressure of the air in the air reservoir tank 2R, FIG. 2C, and regulating in accordance with the detected pressure the opening of the throttle valve 12 located upstream of the inlet of the compressor 2 or the rotating speed of the engine 1. The pressure of the air in the reservoir tank is detected by, for example, a pressure switch and the closing valve 14 is controlled by, for example, a signal from the pressure switch. If the valve 14 is of the electromagnetic type, it is controlled directly by a signal from the pressure switch or the like, while it is controlled indirectly by an electromagnetic valve connected thereto if it is of the pneumatic or hydraulic type.

The output or rotating speed of the engine 1 can also be controlled if the position of a lever for a fuel injection pump for the engine or the displacement of a throttle valve for regulating the quantity of the fuel to be injected is controlled directly in accordance with the pressure of the air in the reservoir tank. The position of the lever or the displacement of the throttle valve may be connected by a link mechanism to the closing valve 14 to control it. Alternatively, the position or displacement may be detected by, for example, a limit switch so that the closing valve 14 may be controlled by an electromagnetic valve directly or indirectly. The valve 14 is opened when the lever has reached a predetermined position in which the injection of fuel is reduced, or when the opening of the throttle valve 12 has been reduced to a predetermined degree.

If the pressure of the air in the reservoir tank rises to a certain level, the engine has a lowered rotating speed and a reduced output, as hereinbefore stated. Therefore, a drop of the engine speed to a certain level may be detected by, for example, an electric pickup or a hydraulic or mechanical displacement (for example, a flyweight) to enable the control of the closing valve 14.

If the fuel injection pump is of the electronically controlled type, the pressure of the air in the reservoir tank may be detected by a pressure transducer and a signal may be transmitted from the transducer to an electronic circuit to control the rotating speed of the engine and also to an operating circuit to control the closing valve 14. The rotating speed of the engine is lowered with a rise in the pressure of the air in the reservoir tank, while the closing valve 14 is opened if the pressure of the air in the reservoir tank rises to a certain level.

The detection of the pressure in the reservoir tank is not the only method for the control of the closing valve 14. It can also be effected in accordance with a differential pressure, FIG. 2D, created by the throttle valve 12 located upstream of the inlet of the rotary positive-displacement air compressor 2. This differential pressure may be converted to a mechanical displacement or an electric signal and if it exceeds a certain level, the closing valve 14 may be controlled to open.

Figure 2E:
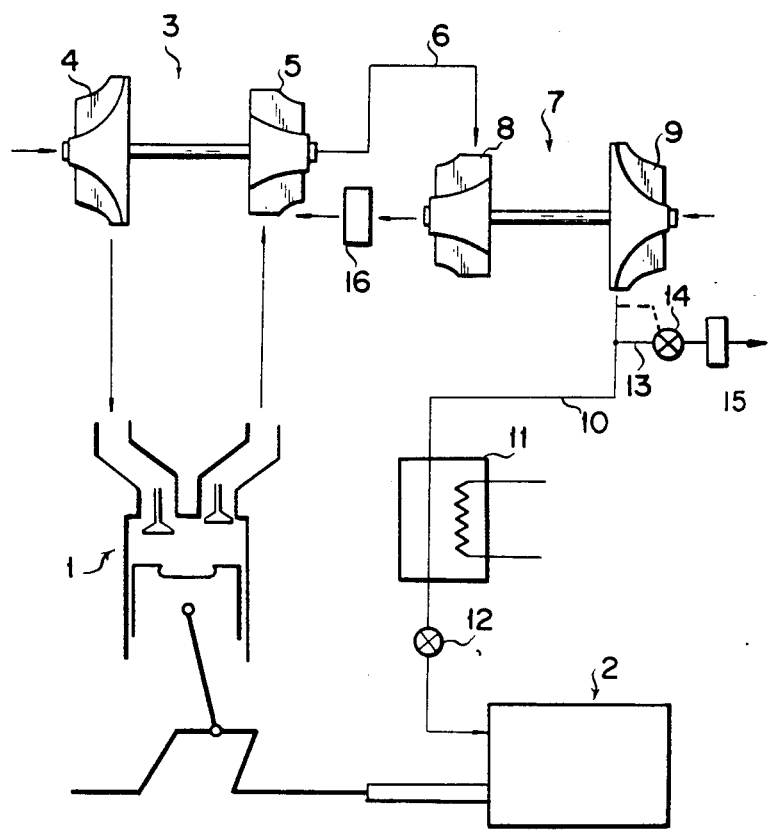
FIG. 2E is a view of still another embodiment of a control for the closing valve.
Figure 2F:
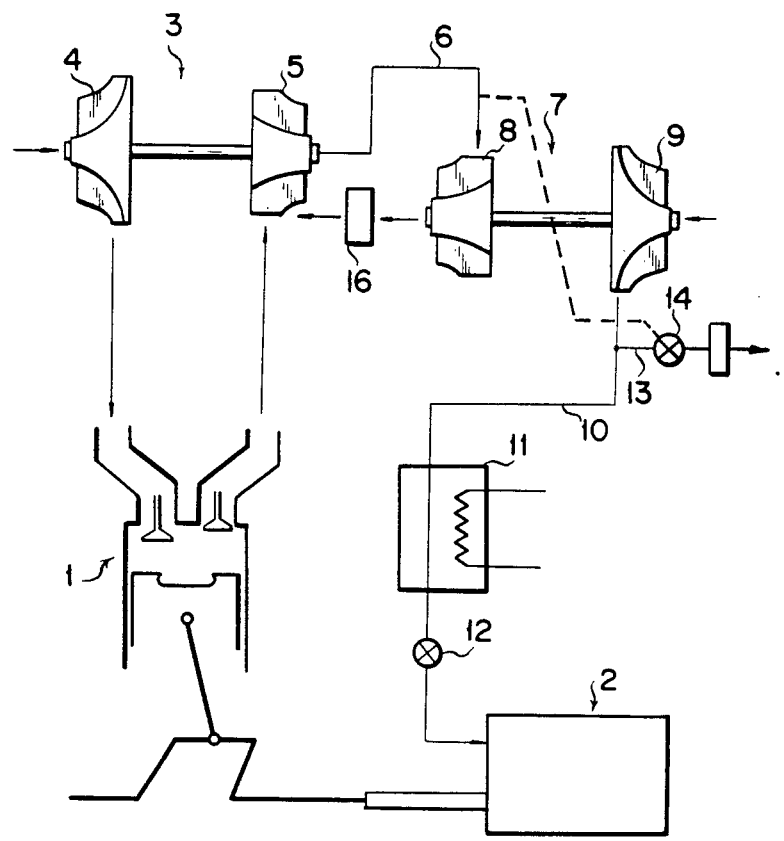
FIG. 2F is a view of still a further embodiment of a control for the closing valve.

The closing valve 14 can also be controlled in accordance with the pressure of the gas at the inlet of the power recovery turbine 8, FIG. 2F, or the pressure of the air at the outlet of the booster compressor 9, FIG. 2E. The valve 14 is opened if the pressure has dropped below a predetermined level.

Figure 8:
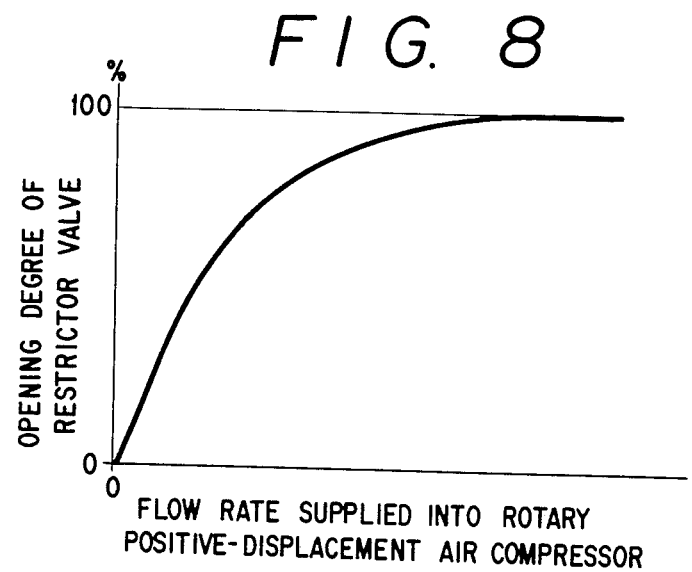
FIG. 8 is a graph showing the relationship between the opening of a throttle valve in a compressed air supply line between the booster compressor and the rotary positive-displacement air compressor and the input to the rotary positive-displacement air compressor.
Figure 9:
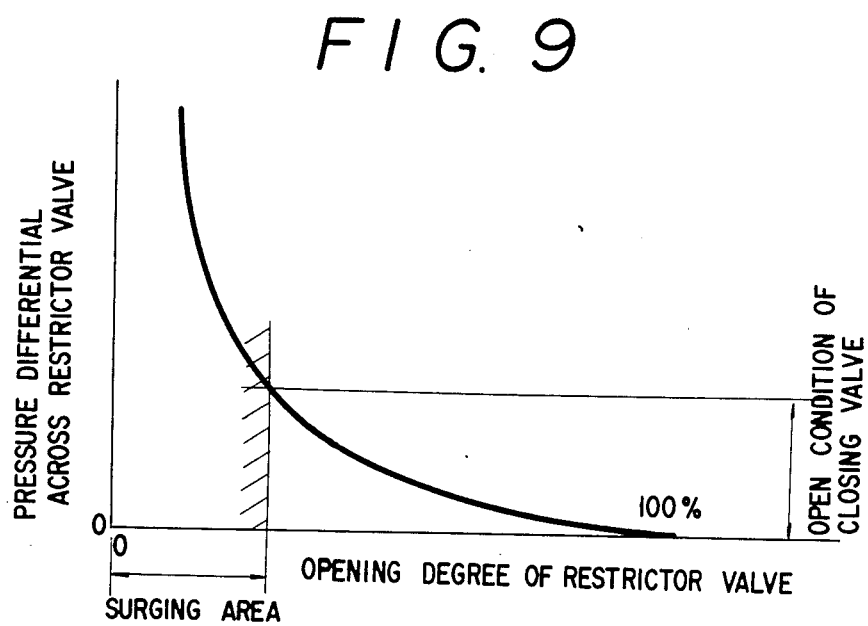
FIG. 9 is a graph showing the relationship between the differential pressure created by the throttle valve and its opening.

The relationship between the opening of the throttle valve 12 and the input of the rotary positive-displacement air compressor 2 is graphically shown in FIG. 8, and the relationship between the opening of the throttle valve 12 and the differential pressure thereby created in FIG. 9.

It is to be understood that the foregoing description is merely illustrative of the preferred embodiments of the invention and that the scope of the invention is not to be limited thereto. Additional modifications or alterations of the invention will readily occur to one skilled in the art without departing from the scope of the invention.

What is claimed is:

1. In a turbo-compound compressor system including a booster compressor connected to a power recovery turbine which is disposed downstream of the outlet of an expansion turbine in a turbocharger for an internal combustion engine and drivable by the exhaust gas of said engine, and a rotary positive-displacement air compressor drivable by said engine, the air delivered by said booster compressor being supplied to said rotary positive-displacement air compressor through a pipeline means having a throttle valve, the improvement which comprises a bypass line connected to said pipeline means for preventing surging and having a closing valve.

2. A turbo-compound compressor system as set forth in claim 1, wherein said bypass line is connected to a discharge line extending between said outlet of said expansion turbine and the inlet of said power recovery turbine.

3. A turbo-compound compressor system as set forth in claim 1, wherein said bypass line has an outlet connected to a point downstream of the outlet of said power recovery turbine.

4. A turbo-compound compressor system as set forth in claim 1, wherein said bypass line has an outlet open to the atmospheric air and is provided upstream of said outlet thereof with a muffler having an oil mist separator.

5. A turbo-compound compressor system as set forth in claim 1, wherein said bypass line has an outlet connected to an intake system for said engine.

6. A turbo-compound compressor system as set forth in claim 1, wherein said bypass line has an outlet connected to a point upstream of the inlet of said booster compressor.

7. A turbo-compound compressor system as set forth in claim 1, wherein said bypass line has an outlet connected to the inlet of a muffler.

8. A turbo-compound compressor system as set forth in claim 1, wherein said bypass line has an outlet connected to a point upstream of the inlet of said power recovery turbine.

9. A turbo-compound compressor system as set forth in claim 2, wherein said bypass line has an outlet connected to a point downstream of the outlet of said power recovery turbine.

10. A turbo-compound compressor system as set forth in claim 2, wherein said bypass line has an outlet connected to the inlet of a muffler.

11. A turbo-compound compressor system as set forth in claim 1, including means for controlling said closing valve in accordance with the pressure of air in air reservoir tank in which said pressure is built up by said rotary positive-displacement air compressor.

12. A turbo-compound compressor system as set forth in claim 1, including means for controlling said closing valve in accordance with a differential pressure which is created by said throttle valve.

13. A turbo-compound compressor system as set forth in claim 1, including means for controlling said closing valve in accordance with the pressure of air at the outlet of said booster compressor.

14. A turbo-compound compressor system as set forth in claim 1, including means for controlling said closing valve in accordance with the pressure of gas at the inlet of said power recovery turbine.

* * * * *